US008539097B2

(12) United States Patent
Maes

(10) Patent No.: US 8,539,097 B2
(45) Date of Patent: Sep. 17, 2013

(54) INTELLIGENT MESSAGE PROCESSING

(75) Inventor: Stephane Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 725 days.

(21) Appl. No.: 11/939,705

(22) Filed: Nov. 14, 2007

(65) Prior Publication Data

US 2009/0125595 A1 May 14, 2009

(51) Int. Cl.
*G06F 15/173* (2006.01)
*G06F 15/16* (2006.01)
*H04M 11/00* (2006.01)
*H04W 4/00* (2009.01)

(52) U.S. Cl.
USPC ........... 709/238; 709/205; 709/206; 709/207; 709/208; 455/406; 455/432.2; 455/466

(58) Field of Classification Search
USPC ............ 709/245–246, 238–242; 379/100.13, 379/142.14; 370/467; 367/74
See application file for complete search history.

(56) References Cited

U.S. PATENT DOCUMENTS

| | | | |
|---|---|---|---|
| 5,414,812 A | 5/1995 | Filip et al. | |
| 5,699,513 A | 12/1997 | Feigen et al. | |
| 5,737,321 A | 4/1998 | Takahashi | |
| 5,786,770 A | 7/1998 | Thompson | |
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |
| 6,163,800 A * | 12/2000 | Ejiri | 709/206 |
| 6,192,414 B1 | 2/2001 | Horn | |
| 6,230,271 B1 | 5/2001 | Wadlow et al. | |
| 6,272,556 B1 | 8/2001 | Gish | |
| 6,275,857 B1 | 8/2001 | McCartney | |
| 6,336,138 B1 | 1/2002 | Caswell et al. | |
| 6,374,305 B1 | 4/2002 | Gupta et al. | |

(Continued)

FOREIGN PATENT DOCUMENTS

| | | |
|---|---|---|
| EP | 2 034 748 A1 | 3/2009 |
| WO | WO 2007134468 A1 | 11/2007 |

OTHER PUBLICATIONS

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

(Continued)

*Primary Examiner* — Evans Desrosiers
(74) *Attorney, Agent, or Firm* — Kilpatrick Townsend & Stockton LLP

(57) ABSTRACT

Intelligent message processing is provided for person to person (P2P) messaging by intercepting the message and processing the message before directing the message to the recipient. The messaging system then acts as a person to application (P2A) and application to person (A2P) system, wherein any P2P message can be intercepted and processed as necessary. Such functionality allows any desired processing of the message, such as to allow for transformation, charging, content filtering, screening, parsing, and any other such processing. Further, such an approach allows the message to be received from the sender and directed to the recipient on different channels. A messaging enabler allows the message to be processed using application logic and/or Web services, for example.

20 Claims, 12 Drawing Sheets

(56) References Cited

U.S. PATENT DOCUMENTS

| | | |
|---|---|---|
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,072,653 B1 | 7/2006 | Sladek et al. |
| 7,073,055 B1 | 7/2006 | Freed et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,334 B2 | 5/2007 | Casati et al. |
| 7,272,625 B1 | 9/2007 | Hannel et al. |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,873,716 B2 | 1/2011 | Maes |
| 7,925,727 B2 | 4/2011 | Sullivan et al. |
| 7,933,397 B2 | 4/2011 | Jain |
| 8,023,971 B2 * | 9/2011 | Egli ............................. 455/466 |
| 8,032,920 B2 | 10/2011 | Maes |
| 8,036,362 B1 | 10/2011 | Skinner |
| 8,068,860 B1 * | 11/2011 | Midkiff ........................ 455/466 |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes |
| 8,401,022 B2 | 3/2013 | Maes et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0131076 A1 | 7/2003 | Nelson et al. |
| 2003/0135553 A1 * | 7/2003 | Pendakur ..................... 709/205 |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0153545 A1 | 8/2004 | Pandya et al. |
| 2004/0161090 A1 * | 8/2004 | Digate et al. ............. 379/202.01 |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0031559 A1 | 2/2006 | Sorokopud et al. |
| 2006/0036689 A1 * | 2/2006 | Buford et al. ................. 709/206 |
| 2006/0041669 A1 | 2/2006 | Bemmel et al. |
| 2006/0053227 A1 * | 3/2006 | Ye et al. ........................ 709/230 |
| 2006/0072474 A1 | 4/2006 | Mitchell |
| 2006/0080117 A1 * | 4/2006 | Carr et al. ......................... 705/1 |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |

| | | |
|---|---|---|
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0080479 A1 | 4/2008 | Maes |
| 2008/0109853 A1 | 5/2008 | Einarsson et al. |
| 2008/0127232 A1 | 5/2008 | Langen et al. |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0186845 A1 | 8/2008 | Maes |
| 2008/0189401 A1 | 8/2008 | Maes |
| 2008/0201705 A1 | 8/2008 | Wookey |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0112875 A1 | 4/2009 | Maes |
| 2009/0119303 A1 | 5/2009 | Rio et al. |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0192004 A1 | 7/2010 | Bauchot et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0182205 A1 | 7/2011 | Gerdes et al. |
| 2011/0258619 A1 | 10/2011 | Wookey |
| 2012/0173745 A1 | 7/2012 | Maes |

OTHER PUBLICATIONS

O'Doherty, Phelim, "JSLEE—SIP Servlet", <http://java.sun.com/products/jain/JSLEE-SIPServlet.pdf, 2003, 13 pages.

The Parlay Group, "Specifications", <http://web.archive.org/web/20050114014707/www.parlay.org/specs/index.asp>, Jan. 14, 2005, 2 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Office Action mailed Nov. 10, 2010, 12 pages.

U.S. Appl. No. 12/019,299, filed Jan. 24, 2008, Advisory Action dated Dec. 9, 2010, 3 pages.

U.S. Appl. No. 12/019,299, filed Jan. 24, 2008, Office Action mailed Jan. 24, 2011, 16 pages.

U.S. Appl. No. 10/855,999, filed May 28, 2004, Final Office Action dated Jan. 5, 2011, 19 pages.

U.S. Appl. No. 11/123,468, filed May 5, 2005, Advisory Action dated Jan. 18, 2011, 2 pages.

U.S. Appl. No. 12/364,642, filed Feb. 3, 2009, Office Action dated Dec. 20, 2010, 18 pages.

U.S. Appl. No. 11/357,653, filed Feb. 16, 2006, Office Action dated Jan. 20, 2011, 18 pages.

Wikipedia, "Parlay", <http://web.archive.org/web/20050130172632/en.wikipedia.org/wiki/Parlay>, Jan. 30, 2005, 3 pages.

Wikipedia, "Object-Oriented Programming", <http://web.archive.org/web/20051211141918/http://en.wikipedia.org/wiki/Object-oriented_programming>, Dec. 11, 2005, 10 pages.

Wikipedia, "OSI model", <http://web.archive.org/web/20050907132012/http://en.wikipedia.org/wiki/Osi_model>, Sep. 7, 2005, 8 pages.

U.S. Appl. No. 11/848,347, filed Aug. 31, 2007, Office Action mailed Oct. 29, 2009, 12 pages.

U.S. Appl. No. 11/951,500, filed Dec. 6, 2007, Office Action mailed Sep. 22, 2009, 24 pages.

U.S. Appl. No. 11/951,500, filed Dec. 6, 2007, Final Office Action mailed Mar. 30, 2010, 26 pages.

U.S. Appl. No. 11/877,129, filed Oct. 23, 2007, Office Action mailed Sep. 28, 2009, 15 pages.

U.S. Appl. No. 11/877,129, filed Oct. 23, 2007, Final Office Action mailed Mar. 29, 2010, 17 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Office Action mailed Jul. 8, 2009, 9 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Advisory Action mailed Apr. 16, 2010, 3 pages.

U.S. Appl. No. 12/019,299, filed Jan. 24, 2008, Office Action mailed Mar. 31, 2010, 13 pages.

International Search Report and Written Opinion of PCT/US2010/037074 mailed Jun. 1, 2011, 16 pages.

U.S. Appl. No. 11/848,347, filed Aug. 31, 2007, Final Office Action mailed Mar. 7, 2011, 21 pages.

U.S. Appl. No. 11/848,347, filed Aug. 31, 2007, Advisory Action mailed May 23, 2011, 3 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action mailed May 23, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/WAP Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 Pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.

U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/014,387, filed Jan. 15, 2008, Office Action mailed Sep. 7, 2011, 19 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 11/848,347, filed Aug. 31, 2007.
U.S. Appl. No. 11/943,101, filed Nov. 20, 2007.
U.S. Appl. No. 12/364,642, filed Feb. 3, 2009, Final Office Action dated Jun. 19, 2012, 24 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 11/070,317, filed Mar. 1, 2005, Notice of Allowance dated Oct. 19, 2012, 11 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/951,500, filed Dec. 6, 2007.
U.S. Appl. No. 10/855,999, filed May 28, 2004.
U.S. Appl. No. 11/070,317, filed Mar. 1, 2005.
U.S. Appl. No. 11/123,468, filed May 5, 2005.
U.S. Appl. No. 12/045,220, filed Mar. 10, 2008.
U.S. Appl. No. 12/019,335, filed Jan. 24, 2008.
U.S. Appl. No. 12/364,642, filed Feb. 3, 2009.
U.S. Appl. No. 11/357,653, filed Feb. 16, 2006.
U.S. Appl. No. 12/544,471, filed Aug. 20, 2009.
U.S. Appl. No. 12/544,484, filed Aug. 20, 2009.

U.S. Appl. No. 12/490,540, filed Jun. 24, 2009.
U.S. Appl. No. 11/949,930, filed Dec. 4, 2007.
U.S. Appl. No. 11/969,343, filed Jan. 4, 2008.
U.S. Appl. No. 12/014,387, filed Jan. 15, 2008.
U.S. Appl. No. 12/018,718, filed Jan. 23, 2008.
U.S. Appl. No. 12/019,299, filed Jan. 24, 2008.
U.S. Appl. No. 12/948,247, filed Nov. 17, 2010.
U.S. Appl. No. 12/948,450, filed Nov. 17, 2010.
U.S. Appl. No. 12/949,287, filed Nov. 18, 2010.
U.S. Appl. No. 12/791,129, filed Jun. 1, 2010.
U.S. Appl. No. 12/949,183, filed Nov. 18, 2010.
U.S. Appl. No. 12/957,697, filed Dec. 1, 2010.
U.S. Appl. No. 13/029,219, filed Feb. 17, 2011.
U.S. Appl. No. 13/029,226, filed Feb. 17, 2011.
U.S. Appl. No. 12/957,740, filed Dec. 1, 2010.
U.S. Appl. No. 13/416,413, filed Mar. 9, 2012.
3rd Generation Partnership Project 2, "Presence Service: Architecture and Functional Description", doc. No. 3GPP2 X.S0027-001-0, published on Sep. 2004.
Day, et al., "RFC 2778, A Model for Presence and Instant Messaging," published Feb. 2000, 17 pages.
U.S. Appl. No. 11/070,317, filed Mar. 1, 2005, Notice of Allowance dated Oct. 19, 2012, 2 pages.
U.S. Appl. No. 12/019,299, filed Jan. 24, 2008, Office Action mailed Dec. 7, 2012, 21 pages.
U.S. Appl. No. 12/948,450, filed Nov. 17, 2010, Office Action mailed Nov. 7, 2012, 48 pages.

\* cited by examiner

INTELLIGENT MESSAGE PROCESSING

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic messaging, and in particular to the processing and routing of messages across a network.

As communications increasingly are done electronically, the number of messaging types and devices, as well as the complexity of those messages, is increasing accordingly. Messaging can be done through different messaging channels, such as email, voice messaging, multimedia messaging, video messaging, SMS, MMS, instant messaging, fax, and print exchange messaging. As such, it is desirable to be able to send and/or receive messages using any of the increasing number of channels, as well as to be able to send messages over different channels.

Further, there is an increasing variety of processing that is desired to be performed on various messages. For example, email messaging channels often want to perform filtering on various messages in order to reduce the amount of unwanted messages (i.e., spam messages), as well as to filter out obscene or objectionable content. For telecommunications companies, it can be desirable to perform charging for various messages, as a user might have to pay for different amounts of text messaging, for example.

Previously, companies have attempted to address these concerns by generating specific modules for handling specific tasks. For example, a company might develop and/or install a filtering application or service to perform message filtering. The company might also have to develop or install a module or service for charging, as well as a number of other modules and/or services for message routing and/or processing. The deployment and maintenance of these programs, as well as the cost of the programs and the increased demand on system resources, makes use of these multiple modules undesirable.

BRIEF SUMMARY OF THE INVENTION

Systems and methods in accordance with various embodiments of the present invention can overcome these and other deficiencies in existing messaging systems by providing for intelligent message processing. Such processing can provide for person to person (P2P), application to person (A2P), person to application (P2A), and application to application (A2A) messaging by intercepting the message and processing the message before directing the message to the recipient. In the case of P2P, for example, the messaging system then acts as a person to application (P2A) and application to person (A2P) system, wherein any P2P message can be intercepted and processed as necessary. Such functionality allows any desired processing of the message, such as to allow for transformation, change of address (one or many), change of channel (one or many), charging, content filtering, screening, parsing, and any other such processing. Further, such an approach allows the message to be received from the sender and directed to the recipient on different channels.

In one embodiment, a message from a sender is intercepted and routed to a message processing component such as a messaging enabler. The message processing component determines the appropriate application logic to be applied to the message, such as by applying a rule or policy to the message, and then processes the message using the determined application logic. The processed message is then directed to the intended recipient, or to a larger set of recipients. If there are multiple recipients, the processed messages can be sent in parallel or sequentially, which can depend on factors such as whether delivery takes place or confirmation is received. A message can be confirmed using any appropriate approach, such as manually by the user or automatically by the messaging channel (e.g., SMS confirmation of delivery, an email confirmation of a read, or a SIP/SIMPLE/MSRP confirmation response).

The sender and recipient each can be a user or application, for example, providing for P2P, A2P, P2A, and A2A intelligent messaging. The messaging enabler also can take advantage of a service delivery platform and service gateway to provide for SOA-based processing. Processing of the message can provide, for example, storing of message content, charging, change of address (one or many), change of channel (one or many), filtering, screening, and transforming of the message, for example. The message also can be intercepted and directed on different channels using different protocols, where the processing of the message enables the message to be delivered on a different channel.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments can overcome the aforementioned and other deficiencies in existing messaging approaches by providing a person to person (P2P) architecture that utilizes a person-to-application (P2A) and application-to-person (A2P) approach wherein each message can be directed to an application capable of adding value by processing the message in a desired way. Such an architecture also can be used for A2P and P2A messaging, and even A2A (application to application) messaging by taking advantage of features and advantages of the various embodiments. Such processing can include any application or can be modeled as policies that process any combination of conditions and actions.

Figure 1A:
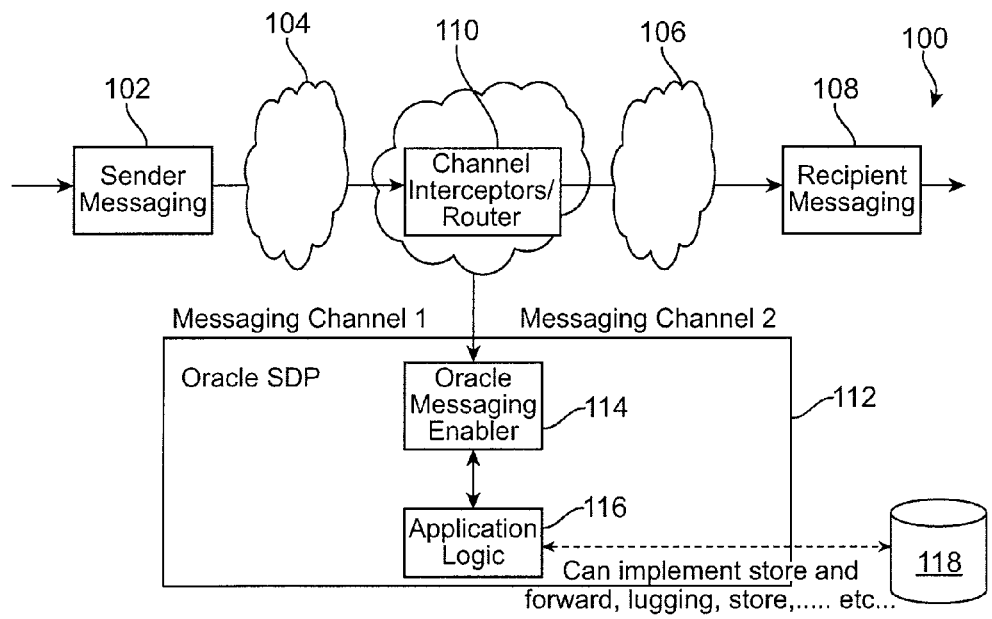
FIGS. 1(a) and 1(b) illustrates messaging architectures that can be used in accordance with embodiments of the present invention.

In one embodiment, a component is provided which is able to send or receive messages across a wide variety of channels. FIG. 1(a) shows an exemplary architecture 100 that can be used to provide such a component. In the figure, a sender 102 shown to send a message through a first channel 104 to a recipient 108 who receives messages over a second channel 106. The clients or devices for the sender and recipient, as well as the type of messaging channels for the first and second channels, can include any appropriate technology as known in the art and/or discussed or suggested herein. At least one channel interceptor 110 is used to intercept a message sent over the first channel 104 and route the message to an application, service, or component providing the application or service, such as a messaging enabler component 114 of a service delivery platform (SDP) 112. The service delivery platform can be any appropriate platform, such as the Oracle Service Delivery Platform available from Oracle Corporation of Redwood Shores, Calif. As shown, the service delivery platform can provide application logic 116 for a number of processing options that can be applied to a message. For example, the application logic can include logic for logging, storing message content to a database 118, charging, filtering, screening, transforming, redirecting to one or more other addresses (e.g. an address function of the channel that is used for communicating), deciding which channel is best to use based on policies (i.e. any combination of nay condition and any action) that can consider information such as presence (i.e., where a user is available for a certain type of communication), location (i.e., what is the most convenient or cheapest approach considering where the user is at the current time), preference (i.e., what does a prefer regarding presence location), time of day, calendar, nature or type of message, address of sender, and other such information. Parallel or sequential messaging also can be accomplished while waiting, for example, for confirmation of delivery in at least one channel, or where no confirmation or response is received. After the application logic is used to process the message, the processed message is passed back to the channel interceptor 110 to be routed over the second channel 106 to the intended recipient 108. The first and second channels can be of the same channel type, such as an SMS channel(s), or can be different channel types. Any necessary conversion for the different channel types can be handled by the application logic.

Figure 1B:
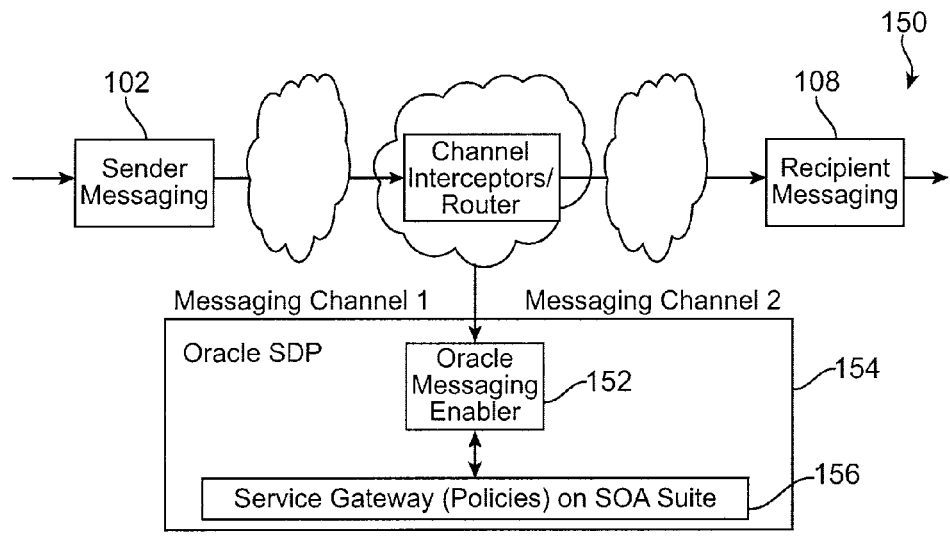

Alternatively, FIG. 1(b) shows an example wherein a messaging enabler 152 of a service delivery platform 154 utilizes a service gateway 156 in order to apply policies to a message. Reference numbers are carried over for convenience between figures for like elements, but it should be understood that this is for simplicity of explanation and should not be interpreted as a limitation on the various embodiments. The service gateway 156 can take advantage of a service-oriented architecture (SOA), for example, to implement policies as rule, Java code, or business process execution language (BPEL) workflows, for example. A SOA also can delegate any processing as needed, such as via Web services. Such an approach allows for any business process to be done at the level of the service gateway. Such an approach also can take advantage of a unified user profile (UUP), as discussed later herein.

Figure 2:
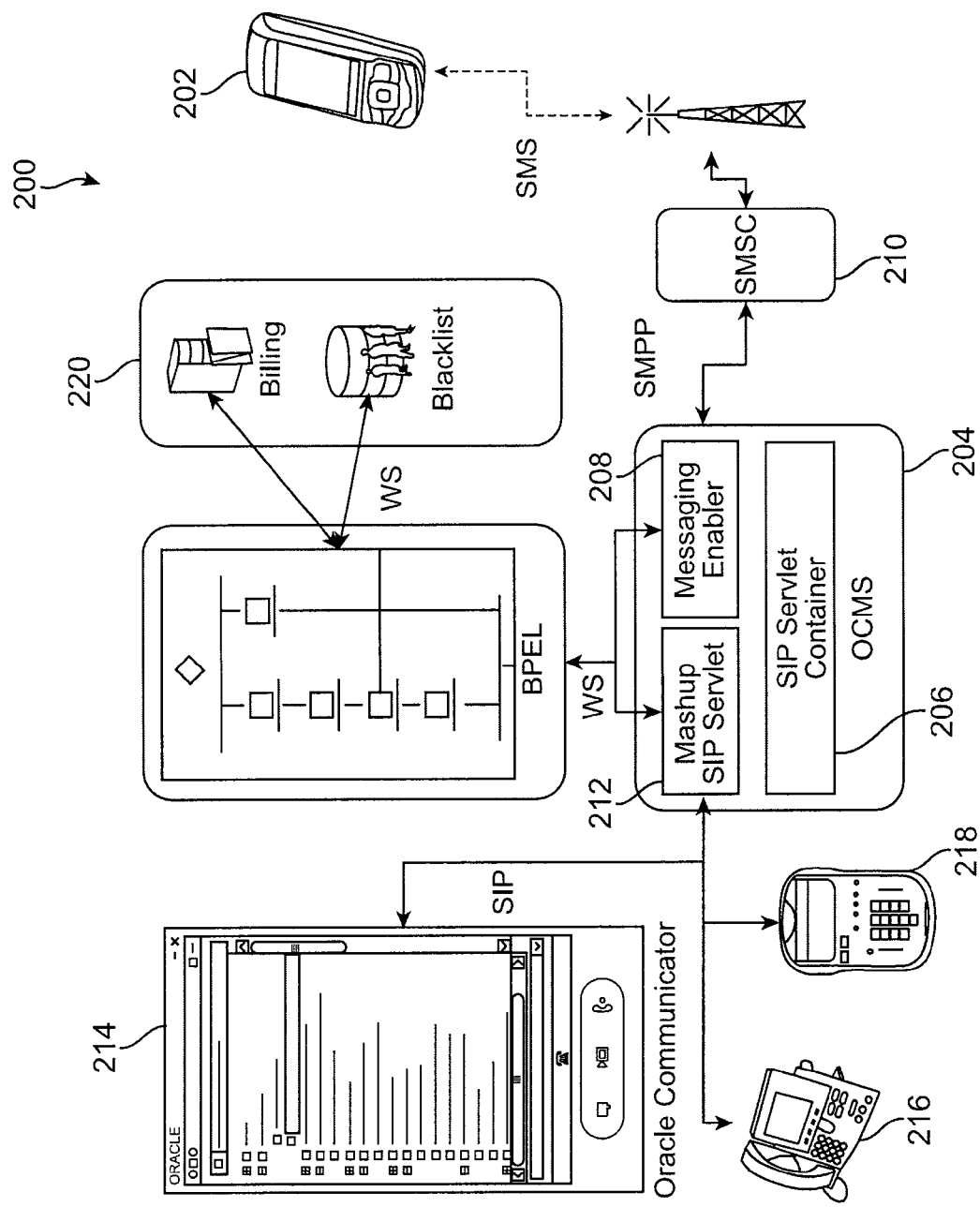
FIG. 2 illustrates flow for a prepaid SIP notification to an SMS-enabled device that can be used in accordance with one embodiment of the present invention.

FIG. 2 illustrates an exemplary configuration 200 wherein a pre-paid Session Initiation Procotol (SIP) notification is delivered to a short message service (SMS)-enabled device 202. In this example, a Communication and Mobility Server 204 is a converged J2EE and SIP Application Server that provides services such as Voice over IP, Presence, Instant Messaging, and an ability to create a multitude of other voice and multimedia services leveraging the SIP, Diameter, and other protocols. The server 204 includes a SIP servlet container 206 that extends the J2EE application server, providing a runtime environment for SIP applications, including services such as security, concurrency, life cycle management, transaction, deployment, and administration. The CMS SIP servlet container 206 provides network services for sending and receiving SIP requests and responses using a combination of transport protocols, IP addresses, and ports. The server 204 also includes a messaging enabler 208 that works with a Short Message Service Center to send and receive SMS messages with the SMS-enabled device 202. The server 204 also includes a mashup SIP servlet 212 that is able to utilize existing services to also send SIP messages to SIP-enabled devices 214, 216, 218. The mashup servlet 212 and messaging enabler 208 can take advantage of Web services to kickoff a BPEL workflow in order to handle processing for the message, such as to check whether there is sufficient balance in a billing database 220 for the pre-paid message and deduct the amount for the message from the amount. The workflow also can work cause the mashup servlet and messaging enabler to convert and send the pre-paid SIP message to the SMS-enabled device using the SMS protocol.

Figure 3:
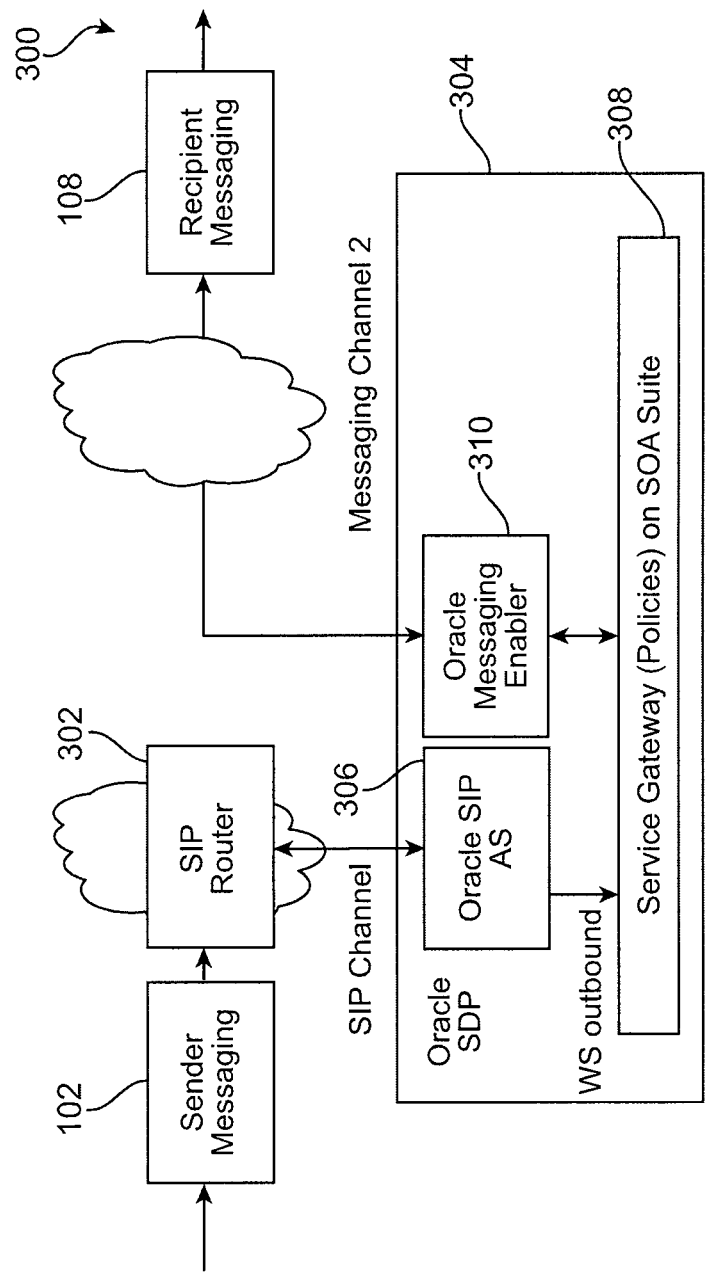
FIG. 3 illustrates a messaging architecture that can be used in accordance with one embodiment of the present invention.

FIG. 3 shows an exemplary architecture 300 in accordance with another embodiment which provides support for Session Initiation Protocol (SIP/SIMPLE) messaging/notifications. In some service delivery platforms, a messaging enabler may not provide support for channels such as a SIP channel. In such an architecture, a SIP message from a sender 102 is received over the SIP channel by a SIP router 302, which separately routes the message to the SDP 304. In this example, the message is routed to a SIP application server (AS) 306 which can pass the message to the service gateway 308 (i.e., a BPEL engine or other SOA policy enforcer/orchestrator) using an approach such as a Web services call out from the AS. The service gateway can call a messaging enabler as described later herein, in order to generate the outbound message, which can pass through the messaging enabler 310 onto the recipient 108. The service gateway also can call the SIP application server to generate an appropriate SIP response.

Figure 4:
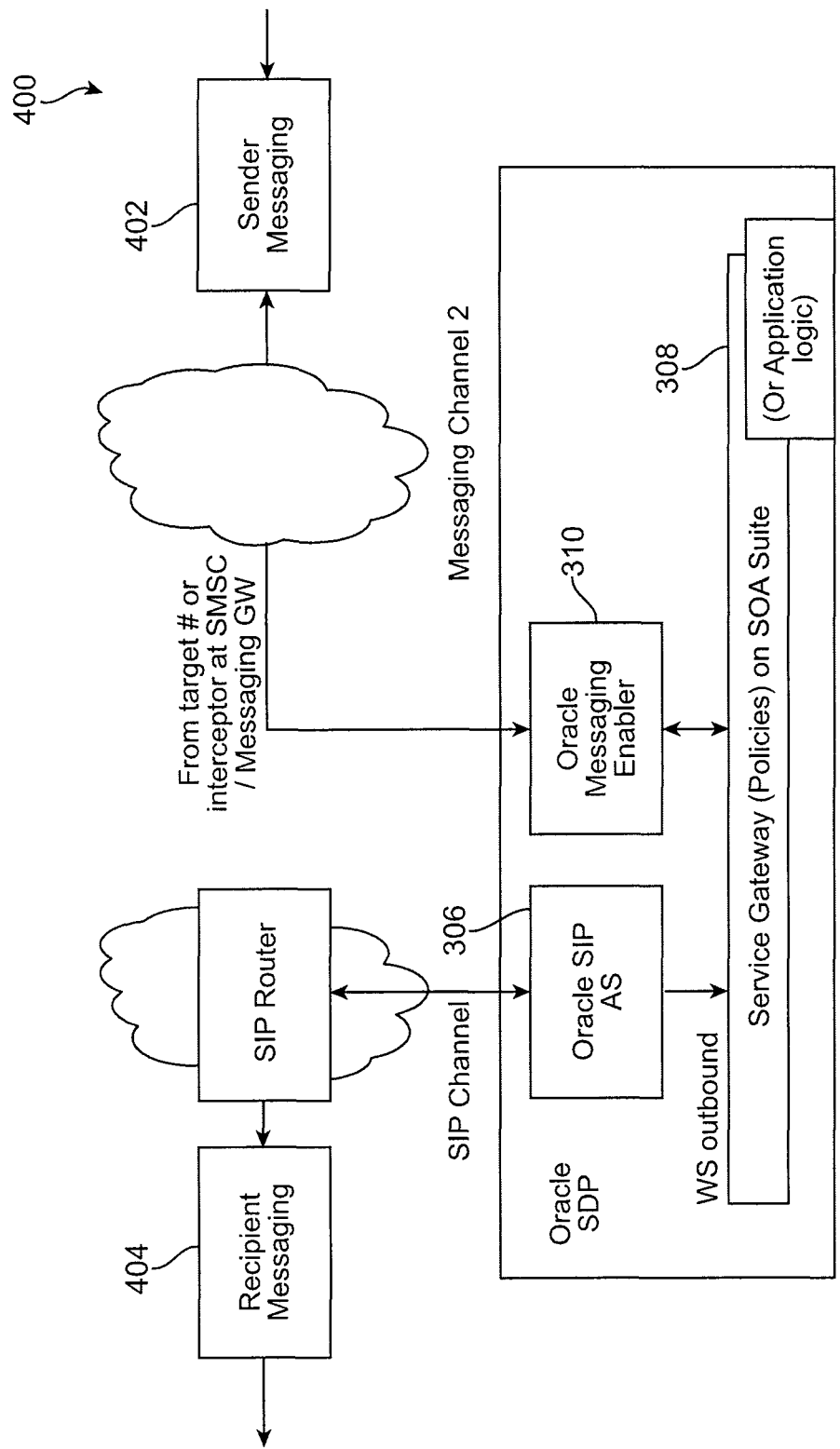
FIG. 4 illustrates a messaging architecture that can be used in accordance with one embodiment of the present invention.

FIG. 4 shows an example 400 of how the basic architecture of FIG. 3 can support bi-directional SIP to and/or from SMS messaging. Any other appropriate messaging channel can be similarly supported. In this example, the sender 402 sends a SMS message where the recipient 404 receives messages via a SIP channel. In this case, the SMS message is intercepted using a target number or interceptor at an SMS messaging gateway, which then routes the message to the messaging enabler 310. The messaging enabler can pass the message to the service gateway 308 (or process the message using application logic), such that the message can be passed to the recipient via the SIP application server 306. In sending out an SMS, the short codes/"from" phone numbers can be reserved, such as by being tagged with an alias of the sender. The message further can be sent to a target with a different originating number per sender, which can expire after a given amount of time or number of messages. For incoming SMS messages, the short code and replier can be matched to the SIP target and sent as a SIP message to the target for a reply. The number can be provided for asynchronous SMS messaging and convention (e.g., different numbers or first word until the first blank is a target SIP address, phone number, or alias) or can be intercepted from the SMSC and passed for processing based on policies, the sender, etc. After a period of time, the mapping is expected to expire.

Figure 5A:
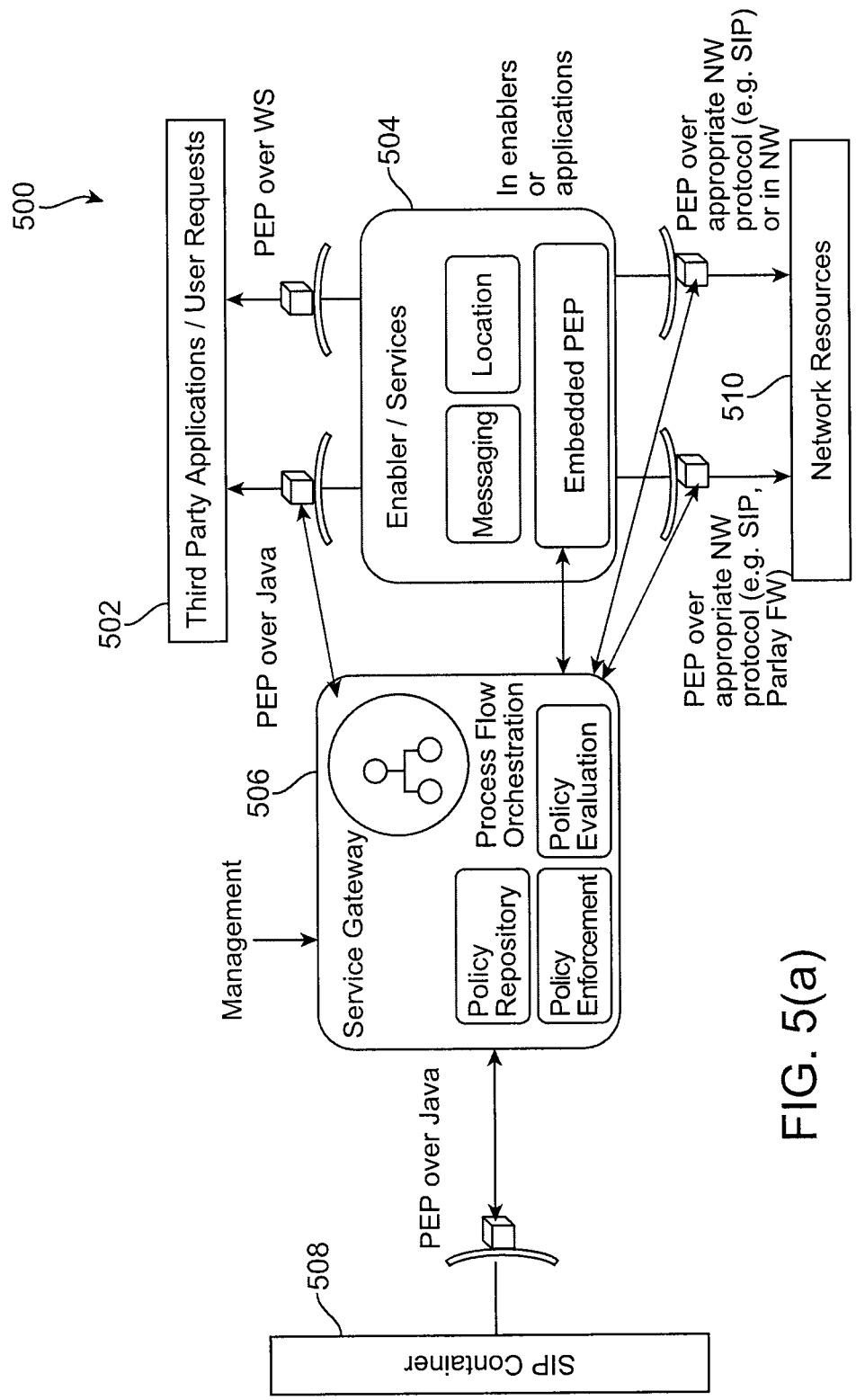
FIGS. 5(a) and (b) illustrate message processing architectures that can be used in accordance with one embodiment of the present invention.
Figure 5B:
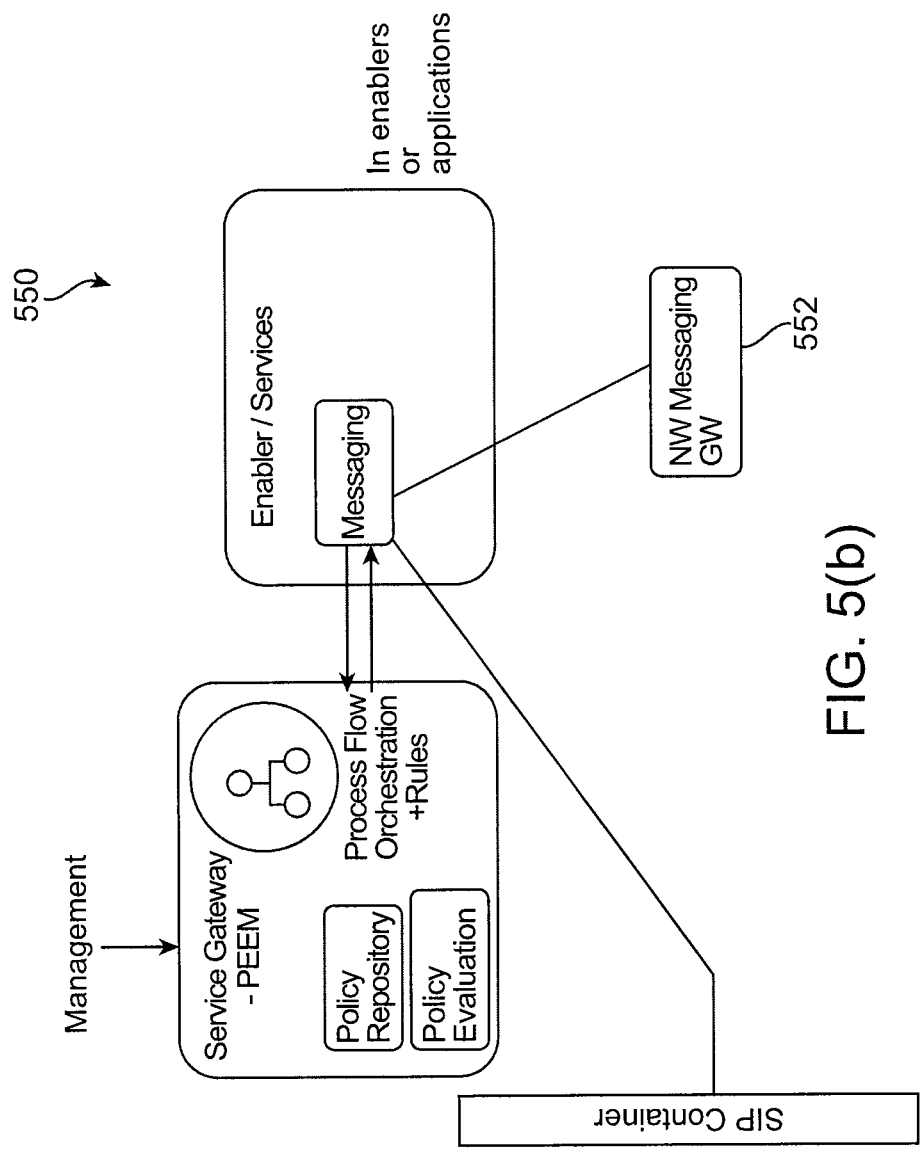

FIG. 5(a) shows an exemplary model 500 for usage of a service gateway 502 that can be used in accordance with various embodiments. It should be noted that use of a service gateway is just an example, as any approach based on rule sets, BPEL and/or SOA composition or orchestration can be considered. Further, such functionality can be provided by application logic. This particular model is described with respect to the messaging enabler and the Policy Execution Point (PEP), although various other technologies can be utilized as would be apparent to one of ordinary skill in the art in light of the teachings and suggestions contained herein. PEP includes interceptors at the edge of the network and service layer, in the service layer, and at the exposure points to local and/or remote applications. A PEP intercepts a message and calls a Policy Decision Point (PDP) to run policies on the message. As described earlier, third party applications or user requests 502 can be received and sent by a message enabler 504 or message service. In this embodiment, the interceptor/PEP is the messaging enabler (or to be precise, the adapters of the messaging enabler to the messaging channels, gateways, etc. such as SMSC, MMSC, email servers, etc.) and SIP mash up, which can also be seen as a messaging enabler/SIP adapter. The enabler can communicate with the service gateway 506 and SIP container 508 using PEP over an appropriate protocol, such as Java. The service gateway can access network resources 510, either directly or via the service enabler, using PEP over a protocol such as SIP or Parlay. The service gateway 506 can include a BPEL workflow component, for example, to control processing of the message. Using such an approach, the service gateway can cause a message to undergo processing such as a switch of messaging channel as may be based on preference, presence information, or other settings; content screening; content transcoding; converging messages in SIP/IMS; and policy execution, enforcement, and management. The code of the application receiving the message (e.g., java, BPEK, SGWG, etc.) acts as the policy processor, performing the operations mentioned, generating modified messages, and sending the modified messages as specified by policy using the messaging enabler. FIG. 5(b) illustrates an alternative model 550 including a NW messaging gateway 552 that acts as the interceptor and can utilize application/script code instead of the service gateway to process the message.

As a result, a notion of IP SMS (i.e., SMS over IP) is defined, similar to how SMS exists on a mobile network. For example, SIP can be used for such messaging where soft clients or a dedicated handset can interface and display directly. In the case of a legacy handset with adapters to an IP network, one can for example allow a message to be stored in the adapter and displayed there as well. For example, the handset itself may have a tone at pickup that will notify whether such messages have been received. For example, for a SIP message to IP adapter with UI on IP adapter, a tone can be emitted when the handset is picked up and a message is there, when a message is converted to voice and played back as voice mail, etc. Also, the handset may be called when a message is received for legacy handsets.

Figure 6A:
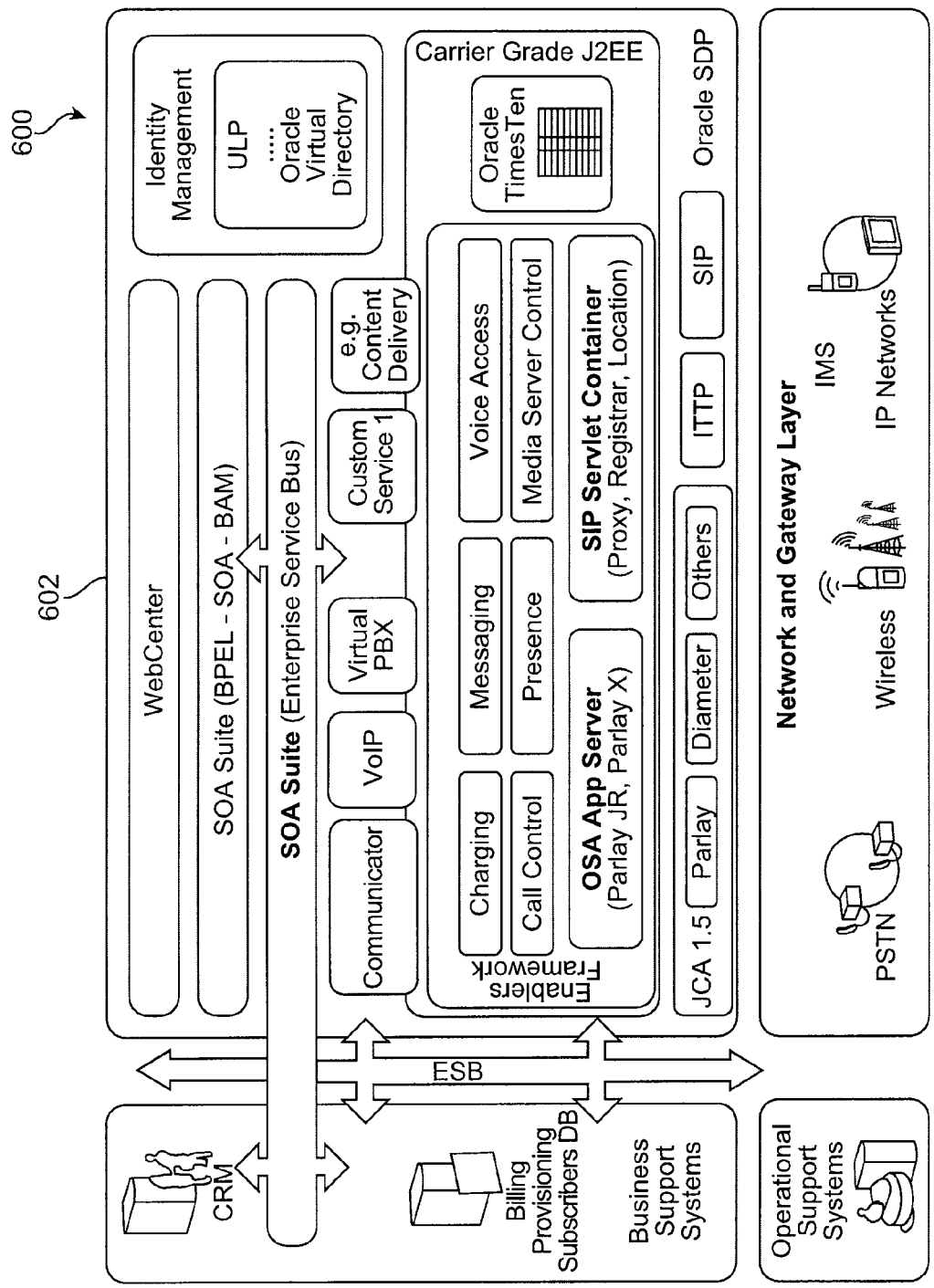
FIGS. 6(a) and 6(b) illustrate a service delivery platform-based architecture that can be used in accordance with one embodiment of the present invention.

In the exemplary architecture 600 of FIG. 6(a), the SDP 602 includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

Figure 6B:
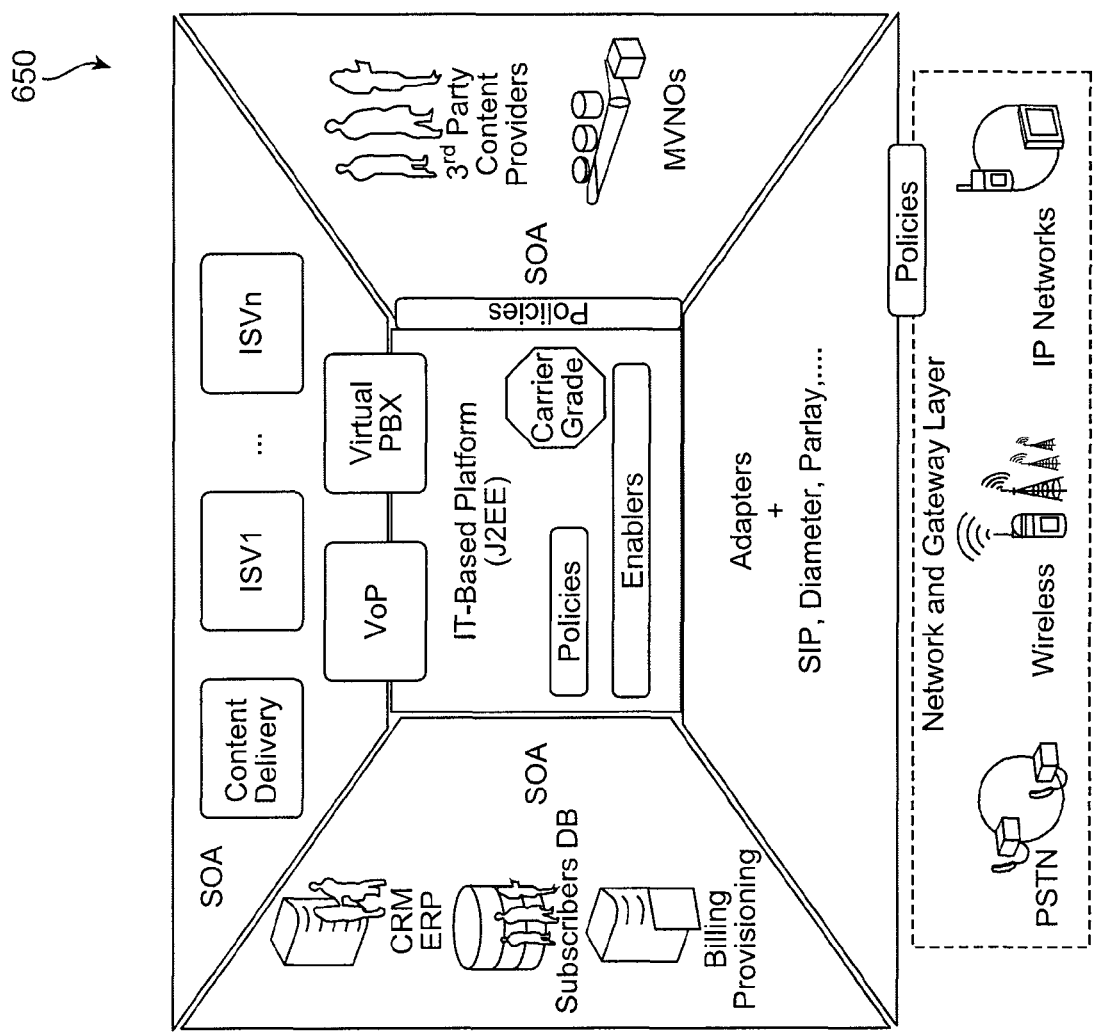

In FIG. 6(b), the SDP configuration 650 implements the desired functionality on top of an underlying J2EE core provided by the application server. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

The SDP can be thought of as a service layer solution that can be deployed on Oracle fusion middleware/OC4J as well as JBOSS, BEA Weblogic, and IBM Webshphere, for example. While SIP is described as a first class citizen protocol besides HTTP, other protocols can be supported out of the box using a recipe for JCA 1.5 adapters to Parlay CORBA, Diameter, Messaging protocols etc. The J2EE container is converged (i.e. every object from SIP, HTTP, J2EE object etc can share context and interact with each others, when it makes sense) and carrier grade (details provided after). This includes the use of TimesTen and open source technologies like JGroups, and also can be able to rely on Tangosol Coherence to provide session replication and efficient distributed cache. The enabler framework includes an OSA AS (i.e. Parlay JR 5.1 J2EE local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container also can include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. It is an out of the box IMS presence server and SIP/SIMPLE presence server. It can also aggregate presence from other networks (e.gt. Parlay network presence) and provide northbound parlay X interface for application to use presence without participating to the presence network. Location data can be modeled as a presence attribute using an extensible presence data model. A multichannel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that exposes online, offline charging balance inquiry and tracking, pre-rated charging etc integrated to Ro/Rf (AAA media gateways), Parlay and Oracle BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

Figure 7:
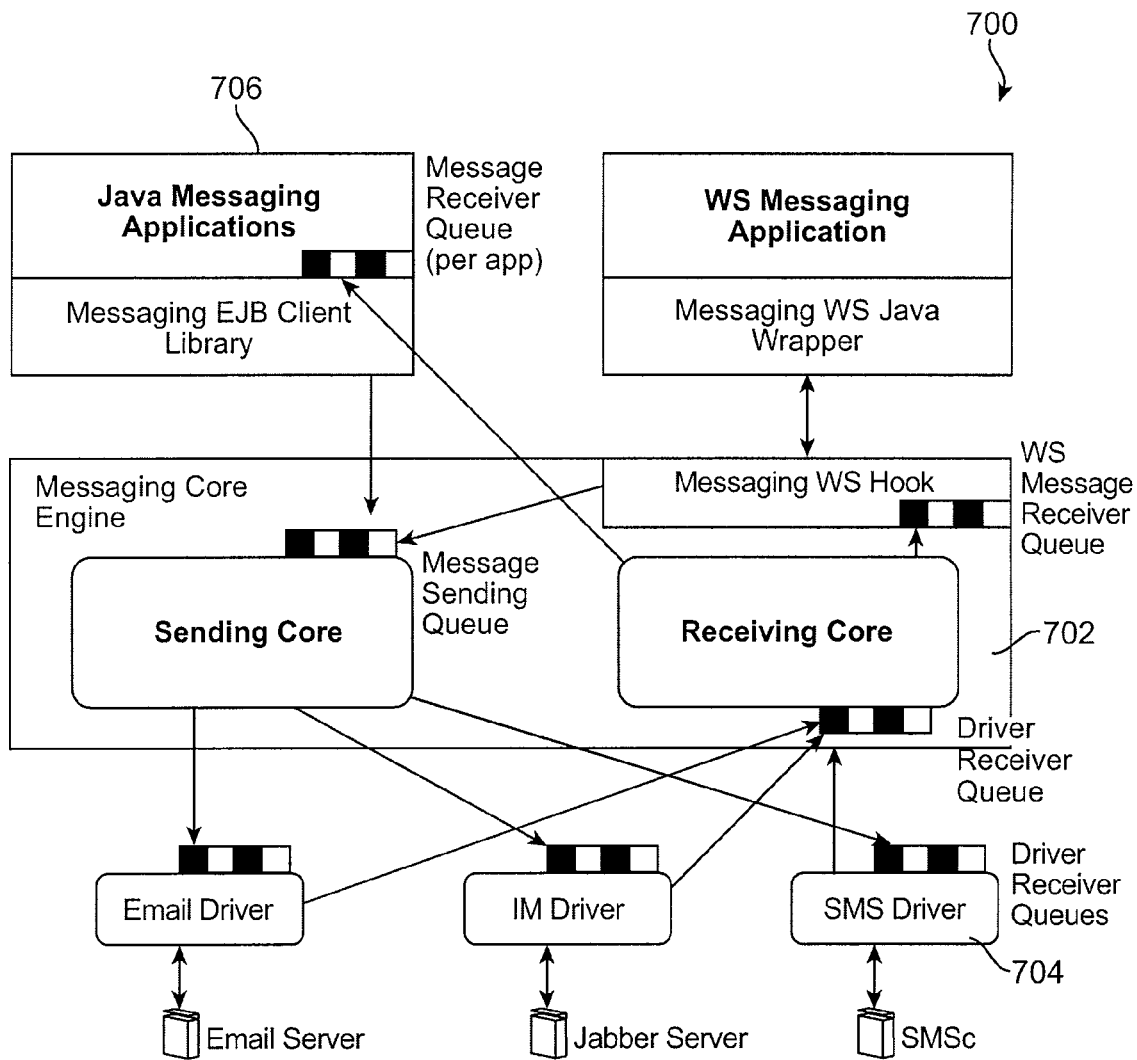
FIG. 7 illustrates an exemplary messaging enabler architecture that can be used in accordance with one embodiment of the present invention.

FIG. 7 illustrates an exemplary messaging enabler architecture 700 in accordance with one embodiment. In this example, the messaging enabler includes a messaging core engine 702 that includes a sending core and a receiving core. The engine communicates with various transport gateways to receive messages from devices and send messages to devices using the appropriate transport protocol to transfer messages through a specified communication channel, such as email. Multiple ME drivers can be plugged into a notification service so an instance of the notification service can serve requests of different transport types. For example, an SMS driver 704 can receive an SMS message that is passed to the receiving core of the messaging engine 702, which then can pass the message to the appropriate application 706, for example, in order to process the message. The processed message then can be returned to a sending core of the messaging engine, which can send the processed message(s) to the appropriate devices over the appropriate channels using the appropriate driver(s).

In one embodiment, a client API can be used to enable a client application to send and receive messages through a notification service, for example. An client application also can interact with the message enabler through an Enterprise JavaBean (EJB) or via Web services, for example. If using an EJB, the client can receive messages by registering a listener to the client MDB. The listener can be called by the MDB whenever there is a message addressed to the application. Clients that call through Web services can use a Java client library, for example, to communicate with the WS server, or those clients can construct messages based on WSDL as specified by the notification service and issue a SOAP request to send out messages. To receive a message with Web Services, the application can register a callback URL so the notification service can deliver a message by making a Web service call to such a URL whenever there is a message addressed to the application.

One or more client applications are allowed to communicate with a notification service at the same time. Each application is identified by a name, and if there are multiple applications with the same name then those applications can be load-balanced. an inbound message addressed to the application can be routed to any one of its instances. The Web service listener can be a layer that which serves the requests from the Web service client application. The messaging enabler driver is a component that can handle device- and protocol-specific communications with external gateways. Each driver can implement the routines for a particular protocol. Multiple instances of a driver can be deployed to connect to different accounts/gateways or for load-balancing purposes.

Both asynchronous and synchronous (polling) status updates can be provided. Polling can be made available for the cases where asynchronous updates are not possible, due to firewall restrictions on the client side and the like. Status obtained from polling contains the value currently cached, and there may be no attempt to retrieve status from the external gateway. For SOAP, asynchronous and synchronous status updates via SOAP can be used by Web services as well as behind the scenes for Java APIs. Delivery status updates can be made available to the API client if the underlying protocol and network/carrier supports those updates. Read report status updates can be made available to the messaging client if the underlying protocol, network/carrier, and destination device supports such an update.

Status reporting enables the client application to get the message sending status synchronously or asynchronously, as the status is available on both transient & persistent modes. A main difference between the two is that for transient mode, data is not maintained after each NS shutdown. The number/type of status obtained by the application also depends on the tracking level specified on each "Send" method call for outbound messages. A full tracking level will trigger status reporting on each status changes. Other levels may respond to only some critical status changes, e.g. a message being sent out by the driver. The level of status being able to be reported also depends on the capability of the gateway. Hence, the NS can only guarantee status reporting of all the internal status, up to the stage where the message is delivered to the external gateway.

Figure 8:
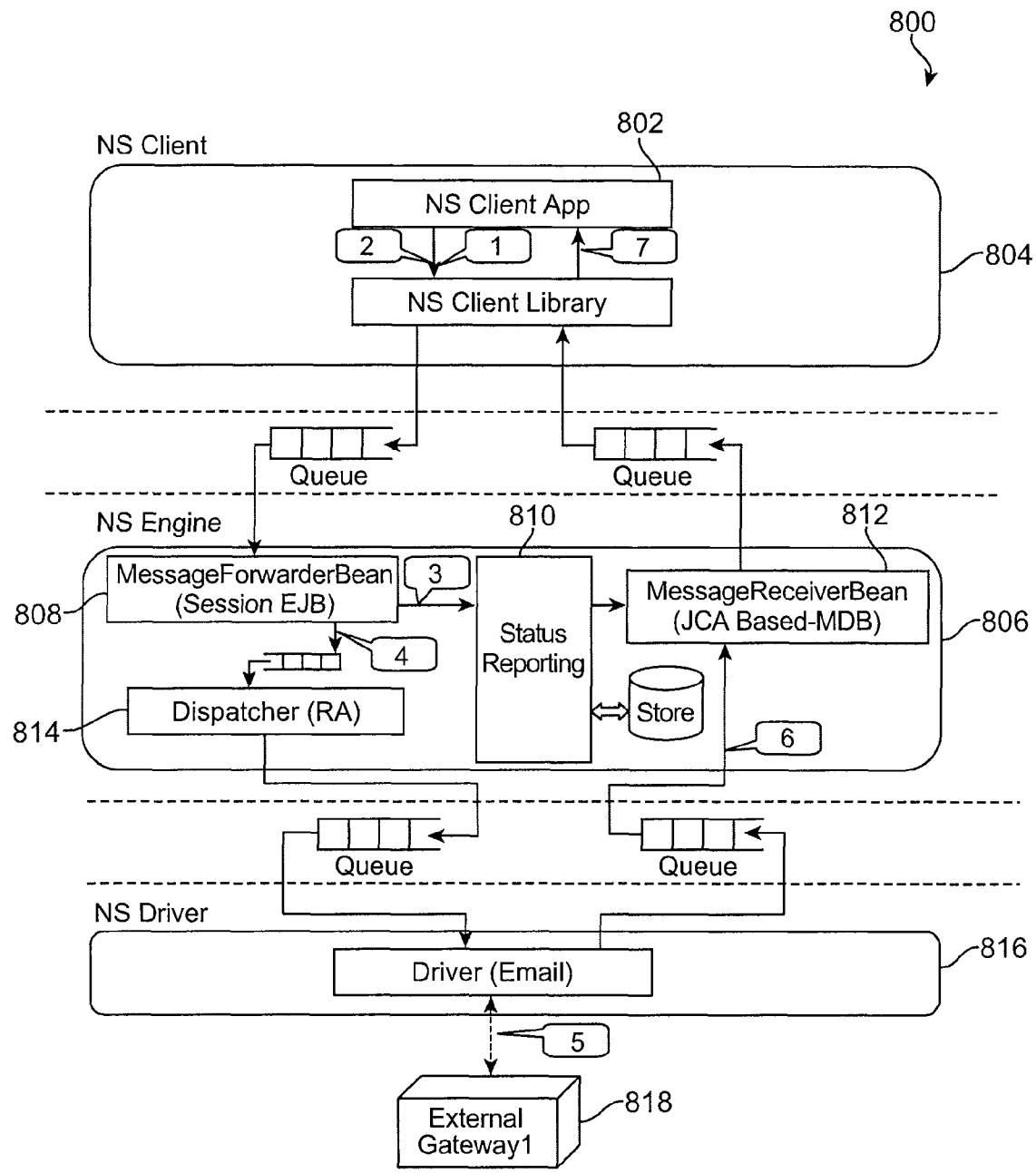
FIG. 8 illustrates an exemplary call flow for a messaging enabler that can be used in accordance with one embodiment of the present invention.

FIG. 8 illustrates the flow 800 for processing of a message using a message enabler in accordance with one embodiment. In this example, a client application 802 registers a status listener to receive status updates. The same client application also issues a message send request through a client API, whereby the client module 804 will bundle the various attributes before the request is sent to the ME engine 806. In one example, these attributes include attributes such as an application instance name, a message id of the request, a status tracking level, a priority, and an expiration time. The request from the client can reside in a message queue until being passed to the ME engine 806. A MessageForwarderBean 808 of the engine calls a status reporting module 810 to compare the tracking level to determine whether the current stage satisfies the reporting criteria. If the stage satisfies the criteria, a status is passed back through a MessageReceiverBean 812. The message is forwarded to a dispatcher 814 (after any necessary queuing), until being routed to the ME driver 816. The ME driver 816 connects to the gateway 818 and issues the message send request. The request status also is reported back to status reporting Module 810. Any subsequent status updates from the gateway 818 also are reported back to the status reporting module. An application status listener can be triggered whenever the status reporting module detects a qualified update for such an instance.

It also is desirable to such an approach to be highly scalable. To achieve high scalability in one embodiment, the message enabler allows for very flexible deployment models which support a number of features. For example, ME clients can be deployed as a separate enterprise archive (EAR) file from the ME engine and tied to the ME engine with a JMS queue. Such an approach improves scalability since request processing can be distributed among client applications.

It also is desirable to balance the load on the various clients. In one embodiment, messages are enqueued at a JMS destination in the notification service engine and picked up by the client applications at the first available node. Load balancing can be achieved by having multiple nodes, with each node having a separate instance of a common client application. Multiple driver instances of the same type can be configured for load balancing purposes. Each driver can have a set of associated attributes to describe driver capabilities. These are the criteria to use for out-bound message routing, including delivery type, carrier, cost, etc. To route a message, the NS engine matches the message information of an out-bound message with the driver attributes and determines the driver to which to route the message. The message can be routed to any appropriate drivers when more than one driver has the right match. Multiple engines can be deployed on different oc4j instances for load balancing.

In one embodiment, the driver is deployed as standalone JCA Resource Adapter that associates with the NS engine through a JMS queue. Once a driver is deployed, the driver sends a registration message to the message enabler with driver information that can include an instance ID, JMS queue on which the driver listened, etc. The ME can subsequently enqueue messages, with the delivery types supported by the driver, to the associated JMS queue This allows the driver to be loosely coupled with ME and enable a driver to be tied to any ME, hence better load balancing. A JMS queue here is used to bind the ME client, engine and driver, although there is no requirement on any specific JMS implementation to be used. Scalability features, such as clustering provided by the underlying JMS implementation, can directly reflect onto the ME queuing capability. The overall design ensures that economically viable horizontal scalability is always achievable.

It also is desirable for such an approach to be highly available. High availability is to obtained in one embodiment by providing for gateway reconnect on failure. Each driver can be configured to retry on failing to connect to external messaging gateway, allowing for self-recovery one the connection is re-established.

It also is desirable for such an approach to be highly reliable. Several mechanisms can be applied to ensure message delivery. For example, on failing to deliver a message through a driver, an ME should be able to re-send from the same driver. A number of retry attempts and the delay between each retry can be configurable. If more than one driver is configured for a given delivery type, the notification service can support driver-level failover, such that if a message cannot be delivered by a first driver after a predefined number of attempts, the message should be automatically consumed and delivered from a second driver by the messaging layer, without further intervention from the client programmer. Messages with a reliable property set to true can be put onto an exception queue once all delivery attempts have been exhausted. Those messages then can be automatically resent after a pre-defined period. The ME can utilize a JMS queue as the media to transfer messages among client applications, the notification service, and the driver. The dequeue operation can be implemented in an atomic operation so that no message will be lost due to system fail after dequeuing. Multiple instances of an ME client application can be deployed for load balancing. An inbound message the for which the application is registered to listen on can be routed to any instance of that application. Once an instance is determined to be down, such as may be determined by a periodic heart-beat as known in the art, subsequent messages can be routed to the instances that are still alive.

Figure 9:
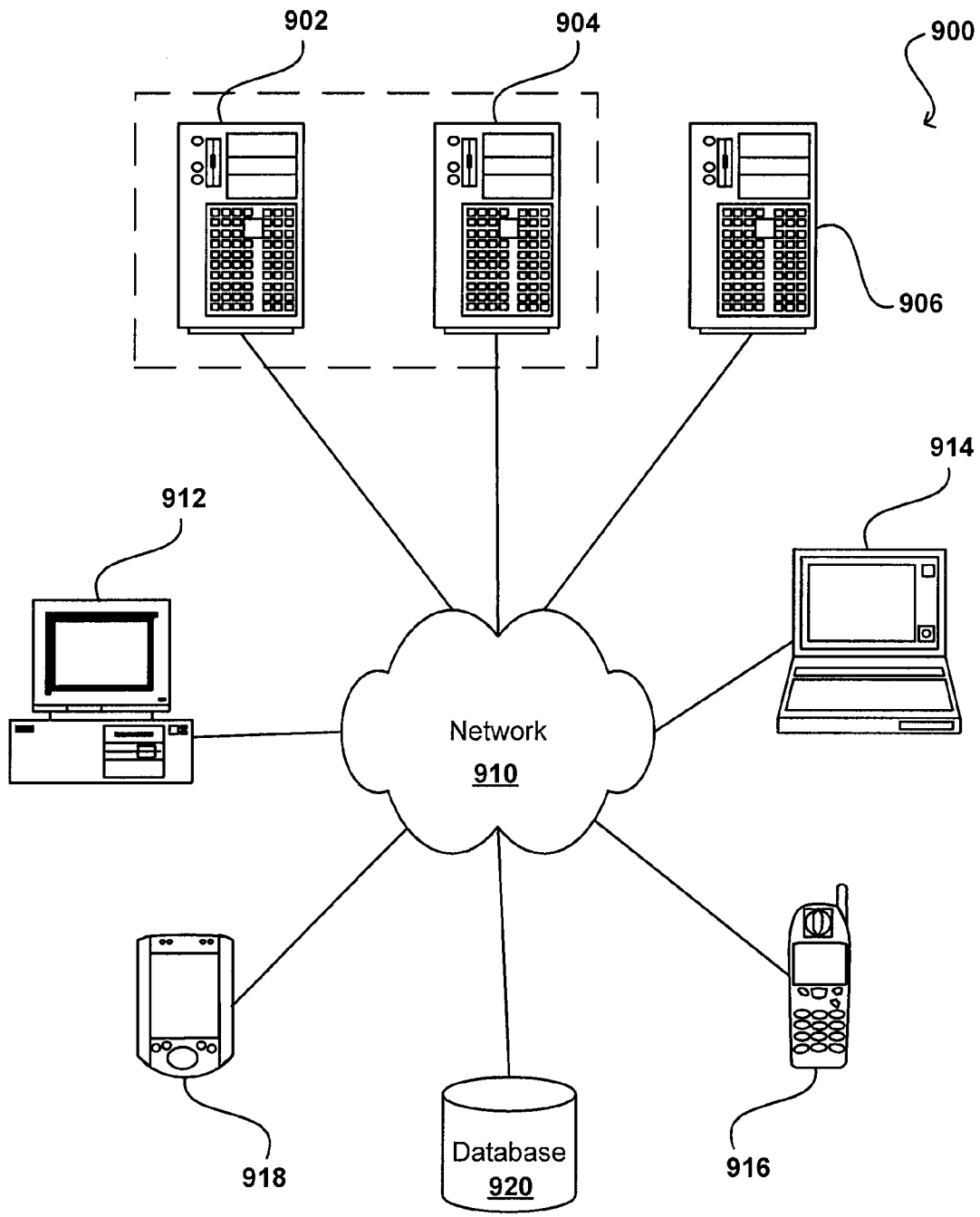
FIG. 9 illustrates components of a computer network that can be used in accordance with one embodiment of the present invention.

FIG. 9 is a block diagram illustrating components of an exemplary operating environment in which various embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network may can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
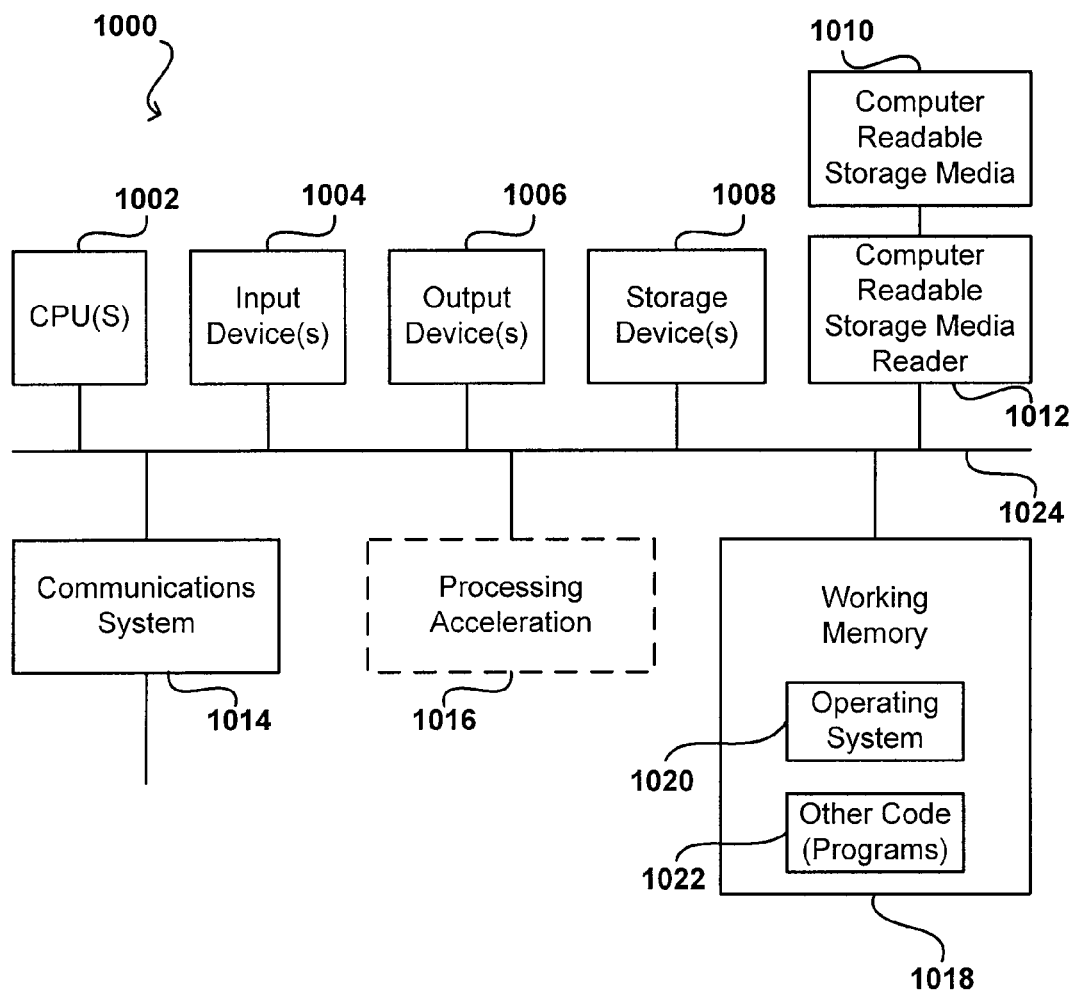
FIG. 10 illustrates components of a computerized device that can be used in accordance with one embodiment of the present invention.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of processing electronic messages, comprising:
   intercepting at a router on a first channel of the router a message from a sender client device to a recipient client device, the router comprising a plurality of channels of different types and the message of a message type of the first channel;
   routing the message from the router to a service-level processing component of a service delivery platform;
   determining by the service-level processing component appropriate service-level application logic to be applied to the message;
   processing the message at the processing component using the determined service-level application logic including selecting multiple second channels of the plurality of channels of the router, converting the message from the message type of the first channel to message types of the second channels of the router different from the first channel and the second message types different from the first message type, and generating multiple processed messages based on the selected multiple second channels;
   returning the processed messages from the processing component to the router; and
   directing the processed messages from the service-level processing component to the recipient client device through the router, wherein the processed messages are directed to the recipient client device on the selected second channels of the router based on the service-level processing of the message at the processing component and wherein at least two of the processed messages are directed to different addresses through different channels of the selected multiple second channels.

2. A method according to claim 1, wherein:
the service-level processing component is a messaging enabler of the service delivery platform.

3. A method according to claim 1, wherein:
the sender is one of a user and an application; and
the recipient is one of a user and an application.

4. A method according to claim 1, wherein directing the multiple processed messages includes sending the multiple processed messages in one of a parallel and a sequential approach.

5. A method according to claim 4, further comprising:
determining whether to send the messages in one of a parallel and a sequential approach by determining whether confirmation is needed for receipt of the processed messages.

6. A method according to claim 1, wherein:
the service-level application logic includes a policy to be applied to the message.

7. A method according to claim 1, wherein the service-level application logic includes logic for processing the message to accomplish at least one of storing message content, charging, change of at least one address, change of at least one channel, filtering, screening, and transforming the message.

8. A method according to claim 1, wherein the message from the sender is directed to the recipient on the second channels using different protocols than the first channel.

9. A method according to claim 8, wherein the different protocols are selected from the group consisting of email, voice messaging, multimedia messaging, video messaging, SIP, SMS, MMS, instant messaging, fax, and print exchange messaging.

10. A method of processing electronic messages, comprising:
intercepting a message from a sender to a recipient at a router on a first channel of the router, the router comprising a plurality of channels of different types and the message of a message type of the first channel;
routing the message from the router to a service delivery platform;
determining by the service delivery platform a service to be used to process the message;
processing the message by the service delivery platform using the determined service, wherein processing the message includes selecting multiple second channels of the plurality of channels of the router, converting the message from the message type of the first channel to message types of the second channels of the router different from the first channel and the second message types different from the first message type, and generating multiple processed messages based on the selected multiple second channels;
returning the processed messages from the service delivery platform to the router; and
directing the processed messages from the service delivery platform to the recipient through the router, wherein the processed messages are directed to the recipient on the selected second channels of the router based on the processing of the message using the determined service, wherein the message from the sender is directed to the recipient on the second channels of the router using a different protocols than the first channel and without returning the processed messages to the router, wherein the different protocols are selected by the determined service from the group consisting of email, voice messaging, multimedia messaging, video messaging, SIP, SMS, MMS, instant messaging, fax, and print exchange messaging, and wherein at least two of the processed messages are directed to different addresses through different channels of the selected multiple second channels.

11. A method according to claim 10, wherein:
the service is a Web service.

12. A method according to claim 10, further comprising:
initiating a BPEL workflow to direct processing of the message.

13. A method according to claim 10, wherein:
the sender is one of a user and an application; and
the recipient is one of a user and an application.

14. A system including a server with a processor and a memory, comprising:
a router having a plurality of different channels including at least a first channel of a first type and multiple second channels of second types, the second channel types being different from the first channel type; and
a service delivery platform communicatively coupled with the router, wherein:
the router intercepts a message from a sender to a recipient on the first channel and routes the message to a service-level processing component of the service delivery platform, the message of a message type of the first channel;
the processing component determines appropriate service-level application logic to be applied to the message, processes the message at the processing component using the determined service-level application logic, returns the processed message to the router, and directs the processed message through the router to the recipient on the multiple second channels of the router based on the determined service-level application logic, wherein processing the messages includes selecting the multiple second channels from the plurality of channels of the router, converting the message from the message type of the first channel to the message types of the second channels different from the first channel and the second message types different from the first message type, and generating multiple processed messages based on the selected multiple second channels, and wherein at least two of the processed messages are directed to different addresses through different channels of the selected multiple second channels.

15. A system according to claim 14, wherein:
the processing component is a messaging enabler of a service delivery platform.

16. A system according to claim 14, wherein:
the sender is one of a user and an application; and
the recipient is one of a user and an application.

17. A system according to claim 14, wherein the processing component processes the message by applying at least one policy to the message.

18. A system according to claim 14, wherein the processing component processes the message to accomplish at least one of storing message content, charging, change of at least one address, change of at least one channel, filtering, screening, and transforming the message.

19. A system according to claim 14, wherein the processing component directs the message to the recipient on the second channels using different protocols than the first channel.

20. A system according to claim 19, wherein at least one of the first and second channels uses a protocol selected from the group consisting of email, voice messaging, multimedia messaging, video messaging, SIP, SMS, MMS, instant messaging, fax, and print exchange messaging.

* * * * *

UNITED STATES PATENT AND TRADEMARK OFFICE
CERTIFICATE OF CORRECTION

| | | |
|---|---|---|
| PATENT NO. | : 8,539,097 B2 | Page 1 of 1 |
| APPLICATION NO. | : 11/939705 | |
| DATED | : September 17, 2013 | |
| INVENTOR(S) | : Maes | |

It is certified that error appears in the above-identified patent and that said Letters Patent is hereby corrected as shown below:

In the Specification

In column 6, line 44, delete "Webshphere" and insert -- Websphere --, therefor.

In column 7, line 2, delete "(e.gt." and insert -- (e.g. --, therefor.

Signed and Sealed this
Seventeenth Day of December, 2013

Margaret A. Focarino
*Commissioner for Patents of the United States Patent and Trademark Office*